United States Patent
Russell et al.

(10) Patent No.: US 7,670,671 B2
(45) Date of Patent: Mar. 2, 2010

(54) DUST, WATER AND SOUND BARRIER INCLUDING A WITNESS LINE FOR EASE OF APPLICATION TO A VEHICLE DOOR

(75) Inventors: Stephen Russell, Plain City, OH (US); Kenichi Kitayama, Dublin, OH (US); Robert Bator, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 868 days.

(21) Appl. No.: 11/424,409

(22) Filed: Jun. 15, 2006

(65) Prior Publication Data
US 2007/0292661 A1 Dec. 20, 2007

(51) Int. Cl.
B32B 3/00 (2006.01)
B32B 15/04 (2006.01)
B60J 5/00 (2006.01)
C09J 5/00 (2006.01)

(52) U.S. Cl. .............. 428/172; 428/354; 296/39.1; 296/146.7; 181/291; 181/293; 156/306.3; 49/502

(58) Field of Classification Search ............... 428/167, 428/172, 343, 354; 296/39.1, 146.5, 146.7; 181/291, 293; 156/306.3; 49/502
See application file for complete search history.

(56) References Cited

U.S. PATENT DOCUMENTS

| 5,409,779 A * | 4/1995 | Puckett et al. ............... 428/500 |
| 6,767,049 B1 | 7/2004 | Morrison et al. |
| 2005/0052051 A1 | 3/2005 | Kohara et al. |
| 2005/0184555 A1 | 8/2005 | Williams, II et al. |

* cited by examiner

Primary Examiner—Donald Loney
(74) Attorney, Agent, or Firm—Mark E. Duell; Rankin Hill & Clark LLP

(57) ABSTRACT

A laminated barrier is provided that can be easily attached to the frame of a vehicle door. The barrier reduces the passage of water, dust and sound into and through the vehicle door. The barrier is generally flat and includes a channel formed therein that aids in locating a bead of adhesive material, aligned with, but located on an opposite side of the barrier from the channel. The bead of adhesive material bonds the barrier to the door frame of the vehicle. The channel acts as a witness line and can be formed as part of an overall thermoforming step, or more simply by using a single heated die element during a step when the barrier is trimmed.

11 Claims, 1 Drawing Sheet

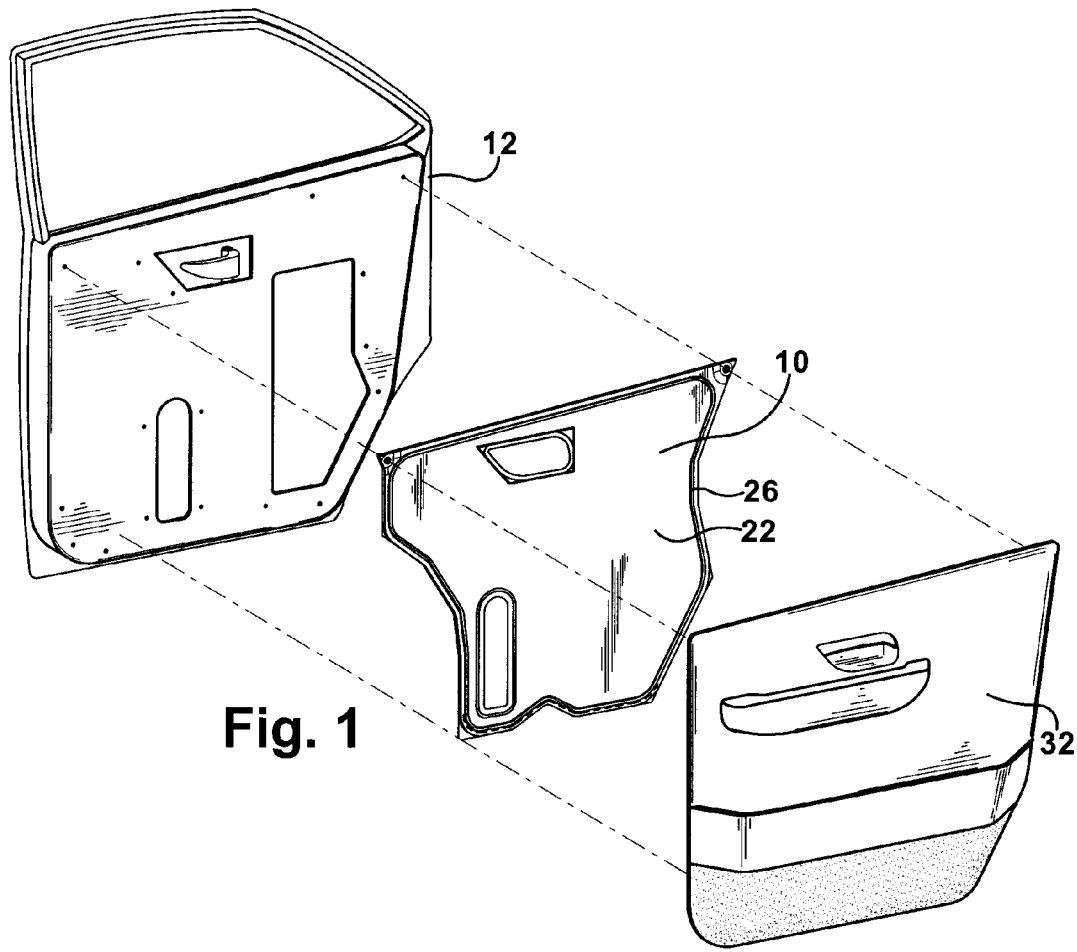
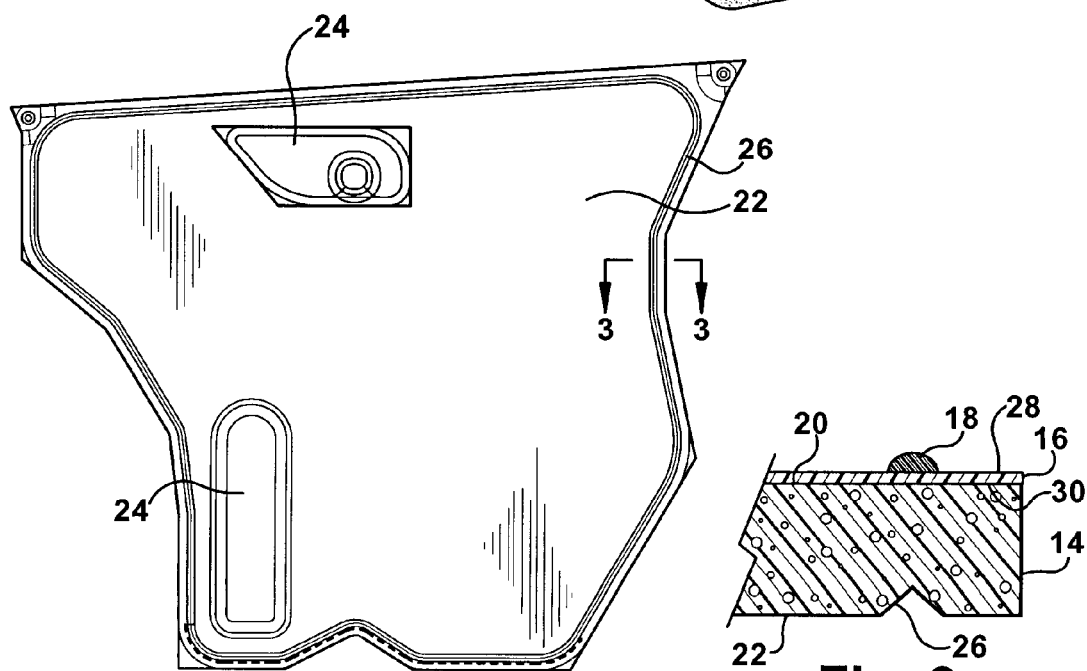
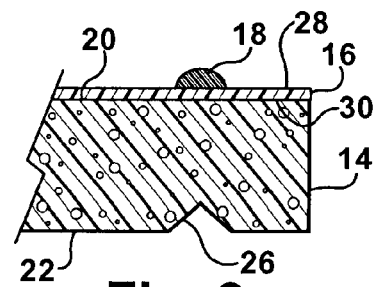

DUST, WATER AND SOUND BARRIER INCLUDING A WITNESS LINE FOR EASE OF APPLICATION TO A VEHICLE DOOR

BACKGROUND OF THE INVENTION

1. Field of the Invention

The invention relates to automobile parts, more specifically to a barrier used on an automobile door that minimizes noise entry into the automobile and dust and water entry into the door structure.

2. Description of Related Art

Barriers are presently used in automobiles to prevent the passage of water and dust, typically from outside of the vehicle, into the door structure. A clear or transparent polymer sheet is used as a barrier. An adhesive, pre-applied to the barrier, is used to bond the barrier to the vehicle door frame. The adhesive is usually pressure sensitive. Pressure is applied, manually, to the opposite side of the barrier from which the adhesive is applied, and as a result the barrier is attached to the frame of the door. Pressure is able to be applied in the correct position on the barrier because a technician can easily see, through the transparent barrier, where on the opposite side of the barrier the adhesive bead is located.

Barriers that combine a sound attenuation layer with a clear polymer layer in a laminate are also known. The sound attenuation layer of the laminated barrier is typically opaque. Thus, an operator installing the barrier cannot see where the adhesive bead is placed and does not know where to specifically apply pressure to cause the barrier to bond properly to the door frame.

In some instances, a portion of the barrier is pinched in a thermoforming process, thus, forming a raised rib upon which adhesive material is placed. When the barrier includes a pinched portion, the location of the raised rib and the adhesive thereon can generally be determined from the side of the barrier opposite the raised rib. However, in many instances, a flat contact surface is required on the front face of the barrier. When the barrier contact surface is not pinched in any way, locating the adhesive from the opposite side of the barrier from which the adhesive is applied is difficult.

What is desired is a simple, flat sound, water and dust barrier that includes a way of locating the position of a bead of adhesive material from the side of the barrier opposite from the side to which the adhesive bead is applied.

BRIEF SUMMARY OF THE INVENTION

The present invention overcomes the deficiencies in the prior art. A laminated barrier, including a sound attenuation layer and water and dust resistant cover layer, is provided that can be easily attached to the door frame of a vehicle. The laminated barrier is generally flat and includes a channel formed therein that aids in locating a bead of adhesive located on an opposite side of the barrier from the channel.

The channel acts as a witness line and can be formed as part of an overall thermoforming process, or more simply by using a single heated die element during a step when the barrier material is trimmed to the required size. The channel of the present invention is an improvement over common witness line types (ink, pencil) in that a separate drawing step is not required to draw the line on the barrier. The channel will not fade or wipe away, which is a problem associated with ink witness lines. Further, the barrier need not include any pinched sections.

These and other aspects of the invention are herein described in particularized detail with reference to the accompanying figures.

BRIEF DESCRIPTION OF THE DRAWINGS

FIG. 1 is an exploded view of a barrier of the present invention along with a vehicle door and door garnish;
FIG. 2 is a side elevational view of the barrier; and
FIG. 3 is a cross-sectional view of the barrier.

DETAILED DESCRIPTION OF THE INVENTION

Referring to FIGS. 1-3, a laminated barrier 10 is shown that is easily attached to a frame 12 of a vehicle door. The barrier 10 includes a sound attenuating core 14, a water and dust resistant cover layer 16 and an adhesive bead 18 to bond the barrier 10 to the door frame 12.

The sound attenuating core 14 has a first flat surface 20 and a second generally flat surface 22. The core 14 is generally in the shape of the door frame 12 to which the barrier 10 is attached. The core 14 includes a series of cut out portions 24 through which vehicle components pass, such as a door handle, arm rest and power window controls. The core 14 may also be slit in several areas to allow access to the interior of the door, for repairs or assembly of door components. The sound attenuation core 14 is preferably made of a batting of woven fibers, but may also be closed cell foam. The core 14 is preferably translucent, but may also be opaque.

A channel 26 is formed in the second surface 22 of the core 14 around an outside perimeter. The channel 26 is preferably V-shaped, although other shapes are also contemplated. The channel 26 functions as a witness line; the channel 26 being aligned with the bead 18 of adhesive bonding material placed on the cover layer 16.

The cover layer 16 is a polymer sheet, preferably polyethylene. The cover layer 16 resists the passage of water and dust therethrough. The cover layer 16 has a similar, if not identical shape as the sound attenuating core 14. The cover layer 16 has a first flat surface 28 and a second flat surface 30. The adhesive bead 18 of bonding material is placed around a perimeter of the first surface 28 of the cover layer 16. The bonding material is preferably a hot melt adhesive, foamed hot melt adhesive, or masked pressure sensitive adhesive (applied by silk screen), although other adhesives are contemplated.

The core 14 and cover layer 16 are preferably provided in a laminated form, attached together in a manner well known in the art. The barrier 10 is supplied in either a sheet or roll form and is trimmed to a desired shape. Trimming takes place in a mold or press. As the barrier 10 is trimmed, a heated die element is used to form the channel 26 within the second flat surface 22 of the core 14. Preferably, the adhesive bead 18 is applied after the core 14 and cover layer 16 combination is removed from the mold or press.

The adhesive bead 18 is applied with a robotic applicator to the barrier 10. The barrier 10 is loaded into a fixture with the cover layer 16 pointing upward. The robotic applicator then applies the adhesive bead 18 in a pre-programmed pattern. Preferably, the adhesive bead 18 is applied prior to shipment of the barrier 10 to the factory where assembly of the automobile takes place. Alternatively, the adhesive bead 18 may be applied to the door frame 12 at the factory and then the barrier 10 attached thereto.

The laminated barrier 10 is applied to the vehicle door frame 12 manually. First, the laminated barrier 10 is aligned or properly positioned relative to the door frame 12. Until pressure is applied to the adhesive bead 18, the laminated barrier 10 may be shifted if the barrier 10 is found to be out of alignment. A technician applies pressure against the channel 26 in the core 14 to push the bead 18 against the door frame 12. The core 14 is compressed slightly and because the core 14 is resilient, applies a force against the cover layer 16 and adhesive bead 18. Preferably, adhesive bonding between the bead 18 and door is accomplished by momentary application of pressure. After the barrier is bonded in place, a door garnish 32 is placed over the barrier 10 to cover the barrier 10.

In alternate embodiments of the invention, the first and/or second surfaces of the core and cover layer are not flat, but are contoured. However, the contour on the second surface of the core is not indicative of the position of the adhesive bead on the first surface of the cover layer, thus, the witness line channel is still required. Also, the barrier may be provided in any size smaller than the door frame if only a certain portion of the door needs to be protected from water and dust intrusion.

The present invention is an improvement over the prior art in that a generally flat laminated barrier, including a sound attenuating layer that blocks the view of an adhesive bead applied to the barrier, can be attached reliably to a vehicle door frame, manually.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A laminated barrier, easily attachable to the frame of a vehicle door, for reducing the passage of water, dust, and sound into and through the vehicle door, the barrier comprising:
    a sound attenuating core including a flat first surface and a second surface opposite the first surface;
    a water and dust resistant layer including a flat first surface and an opposite flat second surface, wherein the resistant layer second surface is joined to the first surface of the core;
    an adhesive bead applied to the first surface of the water and dust resistant layer; and
    a channel formed in the second surface of the core, wherein the channel is aligned with the adhesive bead, and wherein upon attachment of the laminated barrier to the vehicle door, pressure applied to the channel on the core results in compression of the aligned adhesive bead against the vehicle door frame.

2. The laminated barrier of claim 1, wherein the core is translucent.

3. The laminated barrier of claim 1, wherein the core is opaque.

4. The laminated barrier of claim 1, wherein the core is formed of foam.

5. The laminated barrier of claim 1, wherein the core is formed of woven fibers.

6. The laminated barrier of claim 1, wherein the channel has a V-shape.

7. The laminated barrier of claim 1, wherein the second surface of the core is generally flat.

8. A laminated barrier, easily attachable to the frame of a vehicle door, for reducing passage of water, dust and sound into and through the vehicle door, the barrier comprising:
    a water and dust resistant layer having a first surface and a second surface;
    an adhesive bead applied to the first surface of the water and dust resistant layer;
    a core having a first surface and a second surface, wherein the core first surface is joined with the second surface of the water and dust resistant layer and wherein the core prevents and installer from viewing the adhesive bead from the second surface of the core; and
    a channel formed in the second surface of the core, wherein the channel is aligned with the adhesive bead, whereby upon positioning the laminated barrier adjacent the vehicle door, pressure applied to the channel on the core results in compression of the aligned adhesive bead against the vehicle door frame.

9. The laminated barrier of claim 8, wherein the channel has a V-shape.

10. A method of securing a laminated barrier to a vehicle door frame to reduce passage of water, dust, and sound into and through the vehicle door comprising the steps of:
    providing a laminated barrier including:
    a sound attenuating core including a flat first surface and a second surface opposite the first surface;
    a water and dust resistant layer including a flat first surface and an opposite flat second surface, wherein the resistant layer second surface is joined to the first surface of the core;
    an adhesive bead applied to the first surface of the water and dust resistant layer; and
    a channel formed in the second surface of the core, wherein the channel is aligned with the adhesive bead;
    aligning the barrier with the vehicle door frame; and
    manually applying pressure to the channel on the barrier and thereby compressing the adhesive bead against the door frame and attaching the barrier to the vehicle door frame.

11. The method of claim 10, wherein the channel is formed in the second surface of the core using a heated die element.

* * * * *